United States Patent
Chou et al.

(10) Patent No.: US 8,362,740 B2
(45) Date of Patent: Jan. 29, 2013

(54) SYSTEM OF A PLURALITY OF PARALLEL-CONNECTED FUEL CELL CONVERTER DEVICES AND METHOD FOR CONTROLLING THE SYSTEM

(75) Inventors: Chen-Kun Chou, Kwei Shan Township, Taoyuan County (TW); Chi-Bin Wu, Kwei Shan Township, Taoyuan County (TW)

(73) Assignee: Chung-Hsin Electric and Machinery Manufacturing Corp., Jhonghe, Taipei (TW)

(*) Notice: Subject to any disclaimer, the term of this patent is extended or adjusted under 35 U.S.C. 154(b) by 386 days.

(21) Appl. No.: 12/878,273

(22) Filed: Sep. 9, 2010

(65) Prior Publication Data

US 2012/0007543 A1    Jan. 12, 2012

(30) Foreign Application Priority Data

Jul. 6, 2010 (TW) .................. 99122240 A

(51) Int. Cl.
  *H01M 10/44* (2006.01)
  *H01M 10/46* (2006.01)
(52) U.S. Cl. .......................................... 320/101
(58) Field of Classification Search .............. 320/101, 320/103, 107, 116, 118, 122, 126, 128; 429/7, 429/61, 400
  See application file for complete search history.

(56) References Cited

U.S. PATENT DOCUMENTS

| | | | | |
|---|---|---|---|---|
| 6,387,556 | B1 * | 5/2002 | Fuglevand et al. | 429/429 |
| 7,058,484 | B1 * | 6/2006 | Potega | 700/297 |
| 7,378,818 | B2 * | 5/2008 | Fowler et al. | 320/119 |
| 2010/0188045 | A1 * | 7/2010 | Colello et al. | 320/118 |
| 2011/0008689 | A1 * | 1/2011 | Milacic et al. | 429/413 |

* cited by examiner

*Primary Examiner* — Edward Tso
(74) *Attorney, Agent, or Firm* — Stites & Harbison, PLLC; Juan Carlos A Marquez, Esq.

(57) ABSTRACT

A system of a plurality of parallel-connected fuel cell converter devices and a method for controlling the system are provided. The system includes a plurality of fuel cell converter devices, a parallel connection unit, a power control unit, a Mux control unit, and a master controller. The output ends of the plurality of fuel cell converter devices are connected in parallel by the parallel connection unit. The master controller reads signals from the power control unit and the Mux control unit and determines accordingly which fuel cell converter devices need to be turned on to meet the requirement of a load. The method includes the steps of estimating a load, determining the number of the fuel cell converter devices to be turned on, calculating an output power, discharging, and charging. Thus, the plurality of fuel cell converter devices is controlled to output the required power of the load.

12 Claims, 2 Drawing Sheets

SYSTEM OF A PLURALITY OF PARALLEL-CONNECTED FUEL CELL CONVERTER DEVICES AND METHOD FOR CONTROLLING THE SYSTEM

BACKGROUND OF THE INVENTION

1. Technical Field

The present invention relates to a system of a plurality of parallel-connected fuel cell converter devices and a method for controlling the system. More particularly, the present invention relates to a system and a method for charging and discharging via a plurality of parallel-connected fuel cell converter devices.

2. Description of Related Art

Electricity, which has been indispensable to the daily lives of humans since the industrial revolution, is generated nowadays mainly by thermal or nuclear power. However, as both of these power generation methods have adverse impacts on the environment, and given the increasing abnormalities in today's global climate, it is imperative to generate electricity by alternative means.

Fuel cells generate electricity through chemical reactions, which do not produce substances harmful to the environment. Therefore, fuel cells have been an important developing trend of power generation technology. For instance, a conventional fuel cell-based power generation system typically includes three major parts: a fuel cell stack for generating electricity, a converter for converting the unstable electricity generated by the fuel cell stack into a stable power source for output, and a battery for providing electricity in conjunction with the fuel cell stack when the fuel cell stack alone is insufficient to cope with an increase in the load, wherein the battery stops supplying electricity as soon as the power generated by the fuel cell stack meets the load requirement.

The aforesaid conventional fuel cell-based power generation system is disadvantageous in that the electricity generated by the fuel cell stack will not be output when the converter is damaged, which is extremely inconvenient. Moreover, a desired increase in the output power of the fuel cell stack is not achieved until chemical reactions in the fuel cell stack are completed. Therefore, if the load increases abruptly and goes beyond the capacity of the battery, a shortage of power supply is bound to occur, and the load will be affected as a result.

In addition, when fuel is added to the fuel cell stack, the chemical reactions of the added fuel will upset the stability of the output power temporarily, which is likely to damage the load.

BRIEF SUMMARY OF THE INVENTION

It is an object of the present invention to provide a system of a plurality of parallel-connected fuel cell converter devices and a method for controlling the system, wherein the system and the method can prevent the supply of electricity from being interrupted should one of the fuel cell converter devices be damaged, and wherein the system and the method can also prevent unstable power supply which may otherwise occur during fuel refill. In addition, the fuel cell converter devices are modularized and have their output ends connected in parallel, so as to be used in high-power applications.

To achieve the foregoing object, the present invention provides a system of a plurality of parallel-connected fuel cell converter devices, wherein the system includes: a plurality of fuel cell converter devices; a parallel connection unit which is electrically connected to the output ends of the fuel cell converter devices; a power control unit which is electrically connected to a load and configured for calculating the electrical energy required by the load; a Mux control unit which is electrically connected to the parallel connection unit and configured for reading the electrical energy output by the parallel connection unit; a master controller which is electrically connected to the power control unit and the Mux control unit and configured for reading signals from the power control unit and the Mux control unit and controlling the fuel cell converter devices accordingly; an array controller which is electrically connected to the parallel connection unit, the master controller, and each fuel cell converter device; a bi-directional converter which is electrically connected to and controlled by the array controller; and a battery which is electrically connected to and controlled by the bi-directional converter so as to be discharged or charged.

The present invention also provides a method for controlling the foregoing system of the plurality of parallel-connected fuel cell converter devices, wherein the method includes: a step of estimating a load, wherein a load power value and a load output voltage value required by the load are calculated; a step of determining the number of the fuel cell converter devices to be turned on, wherein the number of the fuel cell converter devices that need to be turned on is determined according to the load power value or the load output voltage value, and the fuel cell converter devices selected are defined as the working fuel cell converter devices; a step of calculating an output power, wherein a required output power assigned to and to be provided by each working fuel cell converter device is calculated; a step of discharging, wherein when the available output power of a fuel cell in any of the working fuel cell converter devices is lower than the required output power, the bi-directional converter allows the battery to output electrical energy, so that the power output by that particular working fuel cell converter device reaches the required output power; and a step of charging, wherein when the amount of electricity of the battery is smaller than a predetermined amount and the available output power of any working fuel cell is higher than the required output power, the fuel cell begins to charge the battery.

Implementation of the present invention at least involves the following inventive steps:

1. Even if one of the fuel cell converter devices or one of the fuel cells is damaged, power supply will not be interrupted.

2. Unstable power supply associated with the addition of fuel is prevented.

3. The fuel cell converter devices to be turned on are selected according to load requirements so as to meet the required load voltage or increase the output power.

4. With the elements in the fuel cell-based power generation system being modularized, and the output ends of the fuel cell converter devices being connected in parallel, the present invention is suitable for use in high-power applications.

A detailed description of the features and advantages of the present invention is given below so that a person skilled in the art is enabled to gain insight into the technical contents disclosed herein and implement the present invention accordingly. A person skilled in the art can easily understand the objects and advantages of the present invention by referring to the disclosure of the specification, the claims, and the accompanying drawings.

DETAILED DESCRIPTION OF THE INVENTION

Figure 1:
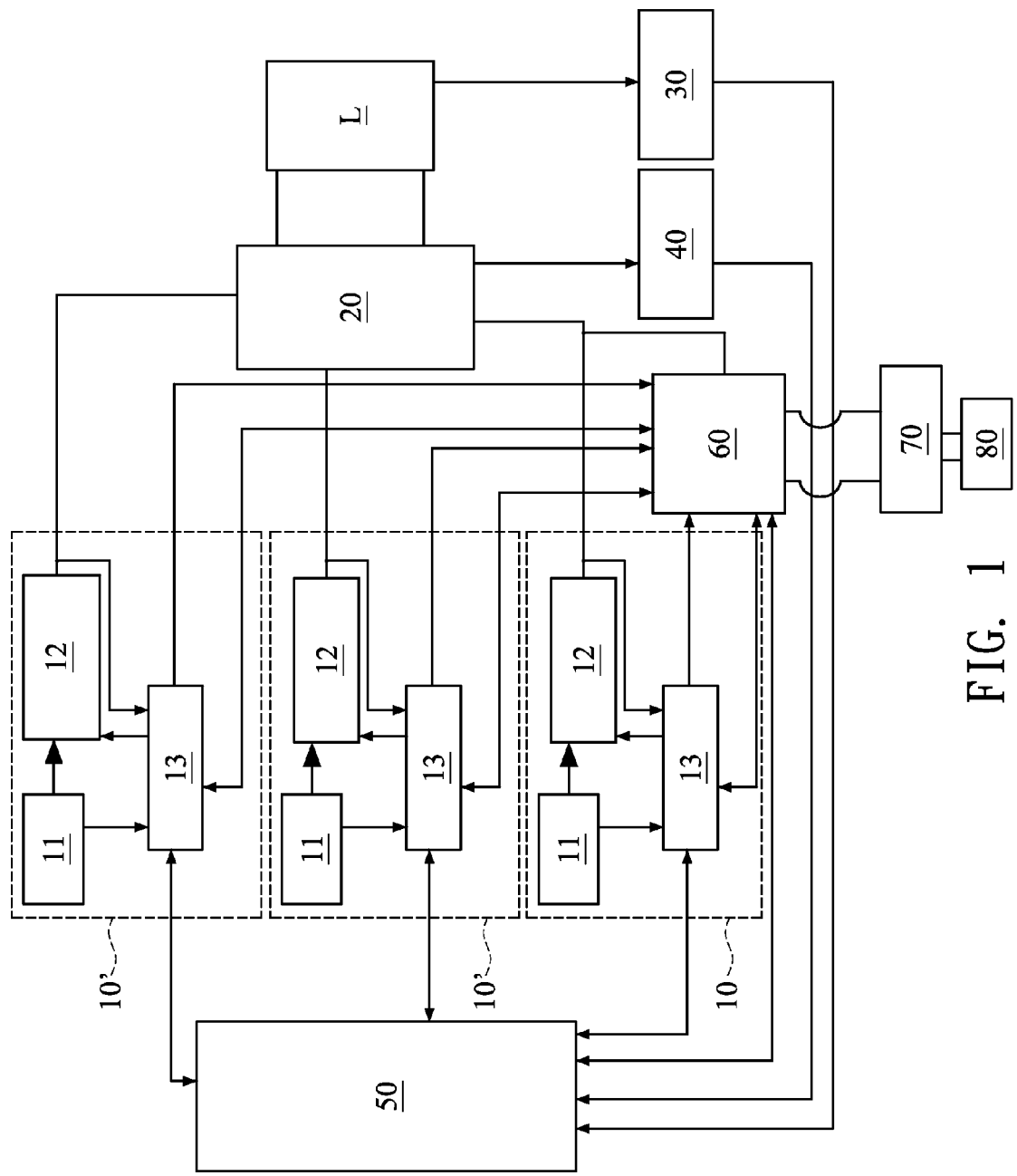
FIG. 1 is a schematic drawing of a system of a plurality of parallel-connected fuel cell converter devices according to an embodiment of the present invention.

Referring to FIG. 1, in an embodiment of the present invention, a system of a plurality of parallel-connected fuel cell converter devices includes: a plurality of fuel cell converter devices 10, a parallel connection unit 20, a power control unit 30, a Mux control unit 40, a master controller 50, an array controller 60, a bi-directional converter 70, and a battery 80.

Each of the plurality of fuel cell converter devices 10 is configured to generate electrical energy and output the electrical energy via its output end.

The parallel connection unit 20 is electrically connected to the output ends of the fuel cell converter devices 10, thus allowing the electrical energy generated by the fuel cell converter devices 10 to be output through the parallel connection unit 20 to a load L.

The power control unit 30 is electrically connected to the load L and is configured to calculate the electrical energy required by the load L.

The Mux control unit 40 is electrically connected to the parallel connection unit 20 and is configured to read the electrical energy output by the parallel connection unit 20.

The master controller 50, which is electrically connected to the power control unit 30 and the Mux control unit 40, is configured to read signals from the power control unit 30 and the Mux control unit 40 and control the fuel cell converter devices 10 accordingly.

The master controller 50 determines, based on signals read from the Mux control unit 40 and the power control unit 30, which fuel cell converter devices 10 to be turned on or the amount of electricity to be discharged by each fuel cell converter device 10, and transmits a control signal to each fuel cell converter device 10.

The array controller 60 is electrically connected to the parallel connection unit 20, the master controller 50, and each fuel cell converter device 10. The bi-directional converter 70 is electrically connected to the array controller 60 while the battery 80 is electrically connected to the bi-directional converter 70. The bi-directional converter 70 is controlled by the array controller 60 and in turn controls charging or discharging of the battery 80.

The battery 80 is configured to provide electricity and can be charged and discharged repeatedly. When the output power of the fuel cell converter devices 10 becomes insufficient, the bi-directional converter 70 is controlled by the array controller 60 to output the electricity stored in the battery 80 and thereby compensate for the insufficiency of electricity. However, when fuel cells 11 in the fuel cell converter devices 10 generate excess electricity, the bi-directional converter 70 is controlled by the array controller 60 to charge the battery 80.

Each fuel cell converter device 10 includes a fuel cell 11, a converter 12, and a sub-controller 13.

Each fuel cell 11 generates the required electricity by chemical reactions.

Each converter 12 is electrically connected to the corresponding fuel cell 11, the corresponding sub-controller 13, and the parallel connection unit 20, and is configured to deliver the electricity generated by the corresponding fuel cell 11 to the parallel connection unit 20, thereby outputting the electricity to the load L. In addition, when the electricity generated by a certain fuel cell 11 is insufficient, the master controller 50 sends out a control signal to the corresponding sub-controller 13, which in turn instructs the array controller 60 to provide the electricity stored in the battery 80 to the parallel connection unit 20.

Each sub-controller 13 is electrically connected to the corresponding converter 12, the corresponding fuel cell 11, and the array controller 60, and is configured to confirm the amount of electricity in the corresponding fuel cell 11, control discharge of the corresponding converter 12, and confirm the amount of electricity output by the corresponding converter 12. Also, each sub-controller 13 is configured to read the amount of electricity stored in the battery 80 and control the array controller 60 accordingly such that the bi-directional converter 70 is in turn controlled by the array controller 60 to discharge or charge the battery 80.

Figure 2:
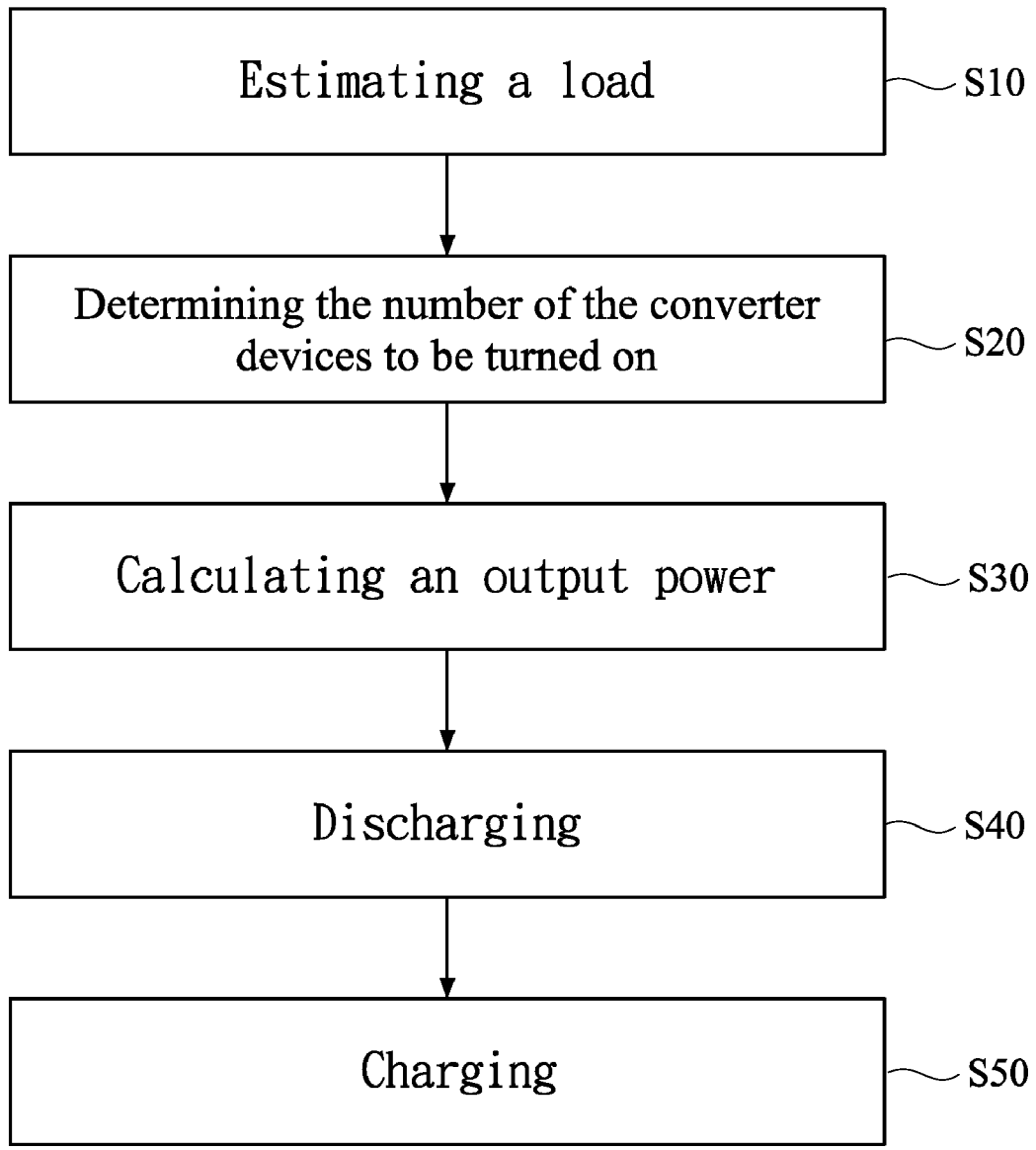
FIG. 2 is a flowchart of a method according to another embodiment of the present invention for controlling the system of FIG. 1.

Referring to FIG. 2, in another embodiment of the present invention, a method for controlling the foregoing system of the plurality parallel-connected fuel cell converter devices 10 includes: a step of estimating a load (S10), a step of determining the number of the fuel cell converter devices to be turned on (S20), a step of calculating an output power (S30), a step of discharging (S40), and a step of charging (S50), as described in detail below.

The step of estimating a load (S10): The power control unit 30 calculates or reads a load power value and a load output voltage value that are required by the load L.

The step of determining the number of the fuel cell converter devices 10 to be turned on (S20): Based on the load power value or the load output voltage value, the master controller 50 determines the number of the fuel cell converter devices 10 that need be turned on. The fuel cell converter devices 10 selected are defined as the working fuel cell converter devices 10'.

More specifically, to determine the number of the working fuel cell converter devices 10', either the load power value is divided by the maximum output power of each fuel cell converter device 10, or the load output voltage value is divided by the maximum output voltage of each fuel cell converter device 10. The master controller 50 controls the fuel cell converter devices 10 that need to be turned on, and the fuel cell converter devices 10 actually turned on are defined as the working fuel cell converter devices 10'. The output ends of the working fuel cell converter devices 10' are connected in parallel by the parallel connection unit 20 so as to output electrical energy.

The step of calculating an output power (S30): The master controller 50 calculates a required output power assigned to and to be provided by each working fuel cell converter device 10'. More specifically, the required output power of each working fuel cell converter device 10' is calculated by dividing the load power value by the number of the working fuel cell converter devices 10'.

The step of discharging (S40): Each sub-controller 13 compares the available output power of the corresponding fuel cell 11 with the required output power and controls the bi-directional converter 70 via the array controller 60 so as to control discharging of the battery 80. When the available output power of the fuel cell 11 in any working fuel cell converter device 10' is lower than the required output power, the bi-directional converter 70 allows the battery 80 to output electrical energy, so as for the power output by that working fuel cell converter device 10' to reach the required output power.

The step of charging (S50): The sub-controllers 13 monitor the amount of electricity stored in the battery 80. When the amount of electricity of the battery 80 is smaller than a predetermined amount, and the amount of electricity output by a certain working fuel cell 11 is greater than or equal to that required by the load L, the corresponding sub-controller 13 controls the array controller 60 in such a way that the bi-directional converter 70 is in turn controlled by the array controller 60 to charge the battery 80.

With the present invention, power supply will not be interrupted if any one of the fuel cell converter devices 10 is damaged; furthermore, unstable power supply which may otherwise occur during fuel refill is prevented. The present invention also features expandability, for more fuel cell converter devices 10 can be added to cope with a significant increase in the load L. Besides, in cases where the load L increases abruptly such that the output power of the working fuel cell converter devices 10' is insufficient to meet the requirement of the load L, the battery 80 is discharged to maintain power supply stability.

The embodiments described above serve to demonstrate the features of the present invention so that a person skilled in the art can understand the contents disclosed herein and implement the present invention accordingly. The embodiments, however, are not intended to limit the scope of the present invention. Therefore, all equivalent changes or modifications which do not depart from the spirit of the present invention should fall within the scope of the present invention, which is defined only by the appended claims.

What is claimed is:

1. A system of a plurality of parallel-connected fuel cell converter devices, comprising:
    a plurality of fuel cell converter devices;
    a parallel connection unit electrically connected to output ends of the fuel cell converter devices;
    a power control unit electrically connected to a load and configured to calculate electrical energy required by the load;
    a Mux control unit electrically connected to the parallel connection unit and configured to read electrical energy output by the parallel connection unit;
    a master controller electrically connected to the power control unit and the Mux control unit and configured to read signals from the power control unit and the Mux control unit and control the fuel cell converter devices accordingly;
    an array controller electrically connected to the parallel connection unit, the master controller, and each said fuel cell converter device;
    a bi-directional converter electrically connected to and controlled by the array controller; and
    a battery electrically connected to and controlled by the bi-directional converter so as to be charged or discharged.

2. The system of claim 1, wherein each said plurality of parallel-connected fuel cell converter device comprises:
    a fuel cell;
    a converter electrically connected to the fuel cell and the parallel connection unit; and
    a sub-controller electrically connected to the converter, the fuel cell, and the array controller, wherein the sub-controller is configured to receive a control signal from the master controller and control the converter accordingly, and wherein the sub-controller is configured to read an amount of electricity stored in the battery and control the array controller accordingly such that the bi-directional converter is controlled by the array controller to discharge or charge the battery.

3. The system of claim 2, wherein the master controller determines, according to signals read by the Mux control unit and the power control unit, which of said fuel cell converter devices need to be turned on and transmits a said control signal to each said sub-controller.

4. A method for controlling the system of claim 1, comprising:
    a step of estimating a load, wherein a load power value and a load output voltage value required by the load are calculated;
    a step of determining the number of said fuel cell converter devices to be turned on, wherein the number of said fuel cell converter devices that need to be turned on is determined according to the load power value or the load output voltage value, and the fuel cell converter devices selected are defined as working fuel cell converter devices;
    a step of calculating an output power, wherein a required output power assigned to and to be provided by each said working fuel cell converter device is calculated;
    a step of discharging, wherein when a fuel cell in any said working fuel cell converter device has an available output power lower than the required output power, the bi-directional converter allows the battery to output electrical energy so that the working fuel cell converter device provides an output power as high as the required output power; and
    a step of charging, wherein when an amount of electricity stored in the battery is smaller than a predetermined amount, and the available output power of any said working fuel cell is higher than the required output power, the fuel cell begins to charge the battery.

5. The method of claim 4, wherein the step of determining the number of said fuel cell converter devices to be turned on comprises either dividing the load power value by a maximum output power of each said fuel cell converter device, or dividing the load output voltage value by a maximum output voltage of each said fuel cell converter device, so as to calculate the number of the working fuel cell converter devices.

6. The method of claim 5, wherein the step of calculating an output power comprises dividing the load power value by the number of the working fuel cell converter devices so as to obtain the required output power to be provided by each said working fuel cell converter device.

7. The method of claim 6, wherein the working fuel cell converter devices are connected in parallel by the parallel connection unit.

8. The method of claim 7, wherein the step of estimating a load comprises calculating, by the power control unit, the load power value and the load output voltage value required by the load.

9. The method of claim 8, wherein the step of determining the number of said fuel cell converter devices to be turned on comprises controlling, by the master controller and according to the load power value or the load output voltage value, the working fuel cell converter devices to be turned on.

10. The method of claim 9, wherein the step of calculating an output power comprises calculating, by the master controller, the required output power to be provided by each said working fuel cell converter device.

11. The method of claim 10, wherein the step of discharging comprises comparing the available output power of each said working fuel cell by a corresponding sub-controller with the required output power, and controlling the bi-directional converter by an array controller so as to control discharging of the battery.

12. The method of claim 11, wherein the step of charging comprises monitoring, by each said sub-controller, the amount of electricity stored in the battery; and controlling the bi-directional converter by the array controller so as to control charging of the battery.

* * * * *